May 4, 1943.   J. W. WILKIE   2,318,549
METAL CUTTING SAW BAND
Filed April 14, 1941

Inventor
James W. Wilkie

Patented May 4, 1943

2,318,549

UNITED STATES PATENT OFFICE 2,318,549

METAL CUTTING SAW BAND

James W. Wilkie, Minneapolis, Minn., assignor to Continental Machines, Incorporated, Minneapolis, Minn., a corporation of Minnesota Application April 14, 1941, Serial No. 388,397

2 Claims. (Cl. 29—95)

This invention relates to saws and refers particularly to saw bands used on metal sawing band saw machines.

In machines of this type the saw band is trained over spaced pulleys which cause the band to traverse the work supported on the table through which the saw passes.

Heretofore, in the manufacture of metal cutting saw bands, it has been necessary to compromise on the steel used for the band in an effort to satisfy the two pre-requisites of a saw band. These two requirements are flexibility to permit continual flexure without crystallization and tooth hardness to enable the saw to cut metal efficiently.

No method has heretofore been available whereby the optimum in each of these two requirements could be realized. Hence, it was necessary to compromise on the steel used and because of this compromise the teeth did not stand up very well, especially when cutting abrasive metals and metals having a high tensile strength such as stainless steel.

In addition, crystallization of the back or band portion of the saw soon terminated the useful life of the saw.

It is, therefore, an object of the present invention to provide a new and novel manner of making a saw band which enables combining maximum flexibility with proper hardness of the cutting teeth to insure maximum cutting efficiency.

More specifically, it is an object of this invention to provide a flexible saw band having a facing on the leading edge of each tooth formed of material which has the desired hardness and general cutting qualities and so connected to and supported by the bodies of the teeth as to guard against fracture of the facing which is quite brittle.

Another very important object of this invention is to provide a saw band of the character described having hardened cutting facings on the leading edges of the teeth and wherein the facings are so disposed and attached that flexure of the band puts no strain on the joint holding them to the teeth.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawing illustrates one complete example of the physical embodiment of the invention constructed in accordance with the best mode so far devised for the practical application of the principle thereof, and in which.

Figure 1:
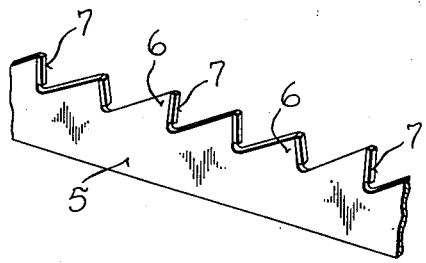
Figure 1 is a perspective view of a portion of a saw band constructed in accordance with this invention.
Figure 2:
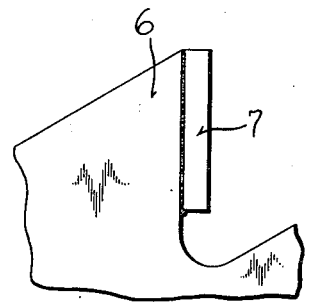
Figure 2 is an enlarged side view showing one tooth of the saw.
Figure 3:
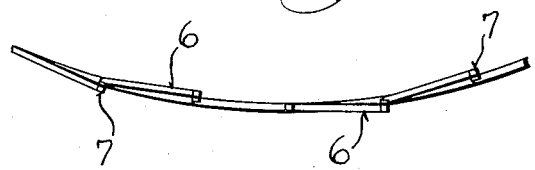
Figure 3 is an edge view of a portion of the band illustrating the disposition of the teeth during flexure.

Referring now particularly to the accompanying drawing, in which like numerals indicate like parts, the numeral 5 designates the back portion of a saw band of the type with which this invention is concerned, one edge of which is provided with saw teeth 6. The band is made of steel having high flexing qualities but not necessarily good cutting qualities.

The teeth 6 are cut in the band in the same manner as heretofore practiced and are "set" or bent to opposite sides to widen the kerf and prevent the saw from sticking or bending in the material being cut as is customary. The teeth of the band are hardened in the same manner as now practiced but this hardening of the teeth is merely to stiffen the same and prevent the "set" from springing during use of the saw.

With the band prepared in this manner a facing 7 of extremely hard material such as sintered carbides is secured to the leading edge of each tooth. Materials sold under the trade names of Carboloy, Kennametal and Firthite have proved exceptionally satisfactory for this this facing. These materials are at least twenty points harder than the teeth of regular metal cutting saw bands. In addition, these materials can be heated red-hot without affecting their temper.

The facings 7 are secured to the front edges of the teeth by being brazed or welded thereto, but in view of the extreme brittleness of the material used for the facing, it is important that the facings be supported over their entire area by the teeth on the band, and to this end the facings are so brazed or welded to the teeth that no portion thereof extends beyond the periphery of the teeth. The facings are thus adequately supported by the backings provided by the teeth and will not break or crack.

Attention is also directed to the fact that the facings occupy positions substantially crosswise of the band. Hence, no strain is placed on the brazed or welded joints securing the facings to the saw teeth.

From the foregoing description taken in connection with the accompanying drawing, it will be readily apparent that this invention makes possible the combination of the two prerequisites of a good metal cutting saw band in the optimum degree so as to provide a saw having long life and extremely high cutting efficiency.

What I claim as my invention is:

1. A saw band comprising: a ribbon-like strip of highly flexible steel; tooth-like supports formed along one edge of said strip integral therewith; and a facing of material having good cutting characteristics brazed to the leading face of each of said supports with no portion of the facings projecting beyond the plane of their supports, said facings providing a long wearing cutting edge for the tooth-like supports, the brazed joints between the tooth-like supports and the facings being on lines substantially normal to the longitudinal axis of the band so that flexure of the band imposes no undue strain on the brazed junctures.

2. A saw band comprising: a thin metal band having high flexibility but not necessarily good cutting qualities; tooth-like supports along one edge of the band and integral with the band, adjacent tooth-like supports being bent to opposite sides of the flat plane of the band to give the supports "set," said tooth-like supports being hardened to the exclusion of the body of the band to prevent the "set" of the tooth-like supports from springing during use of the saw and so as not to impair the flexibility of the body of the band; and a facing of material having good cutting characteristics brazed to the leading face of each of said tooth-like supports with no portion of the facings projecting beyond the plane of their supports, said facings providing a long wearing cutting edge on the leading faces of the tooth-like supports, and the brazed joints between the tooth-like supports and the facings being on lines substantially normal to the longitudinal axis of the band so that flexure of the band imposes no undue strain on the brazed joints.

J. W. WILKIE.